United States Patent
Faust et al.

[11] Patent Number: 5,934,748
[45] Date of Patent: Aug. 10, 1999

[54] VEHICLE SEAT WITH TEMPERATURE AND VENTILATION CONTROL AND METHOD OF OPERATION

[75] Inventors: Eberhard Faust; Karl Pfahler, both of Stuttgart, Germany

[73] Assignee: Daimler-Benz Aktiengesellschaft, Stuttgart, Germany

[21] Appl. No.: 09/016,945

[22] Filed: Feb. 2, 1998

[30] Foreign Application Priority Data

Jan. 31, 1997 [DE] Germany ............................ 197 03 516

[51] Int. Cl.⁶ ...................................................... A47C 7/72
[52] U.S. Cl. ................................ 297/180.12; 297/180.1; 297/180.13
[58] Field of Search ...................... 297/180.14, 180.13, 297/180.12, 180.1; 5/423, 469

[56] References Cited

U.S. PATENT DOCUMENTS

| | | |
|---|---|---|
| 4,413,857 | 11/1983 | Hayashi . |
| 4,572,430 | 2/1986 | Takagi et al. . |
| 5,117,638 | 6/1992 | Feher . |
| 5,385,382 | 1/1995 | Single et al. ........................ 297/180.13 |
| 5,524,439 | 6/1996 | Gallup et al. . |

FOREIGN PATENT DOCUMENTS

| | | |
|---|---|---|
| 0424160 | 4/1991 | European Pat. Off. . |
| 2136947 | 2/1973 | Germany ............................ 297/180.1 |
| 3732841 | 4/1989 | Germany . |
| 3903303 | 8/1990 | Germany . |
| 4014550 | 11/1990 | Germany . |
| 4112631 | 4/1992 | Germany . |
| 19628698 | 10/1997 | Germany . |
| 59-79992 | 5/1984 | Japan . |
| 64-30042 | 2/1989 | Japan . |
| 7-24159 | 5/1995 | Japan . |
| 2200806 | 8/1988 | United Kingdom ................ 297/180.1 |

*Primary Examiner*—Laurie K. Cranmer
*Attorney, Agent, or Firm*—Evenson, McKeown, Edwards & Lenahan, PLLC

[57] ABSTRACT

A vehicle seat having seat and backrest cushions includes a ventilation device for ventilating the cushions as well as a heating device for heating the cushions. A desirable sitting climate providing high comfort is produced by eliminating both a seat user's perspiration and overcooling. The desirable sitting climate is assured by a control unit which is connected on an input side with a temperature sensor arranged in a cushion and on an output side with the electric circuits of the ventilation unit and the heating unit. The control unit is adjusted such that, at cushion surface temperatures measured by the temperature sensor which are above an indicated value, it switches on the ventilation device or changes it to a higher power stage and/or switches off the heating device or changes it to a lower heating capacity. At cushion surface temperatures which are below the indicated value, the control unit switches off the ventilation device or changes it to a lower power stage and/or switches on the heating device or changes it to a higher power stage. The control unit may also operate based on an output from a moisture sensor.

15 Claims, 1 Drawing Sheet

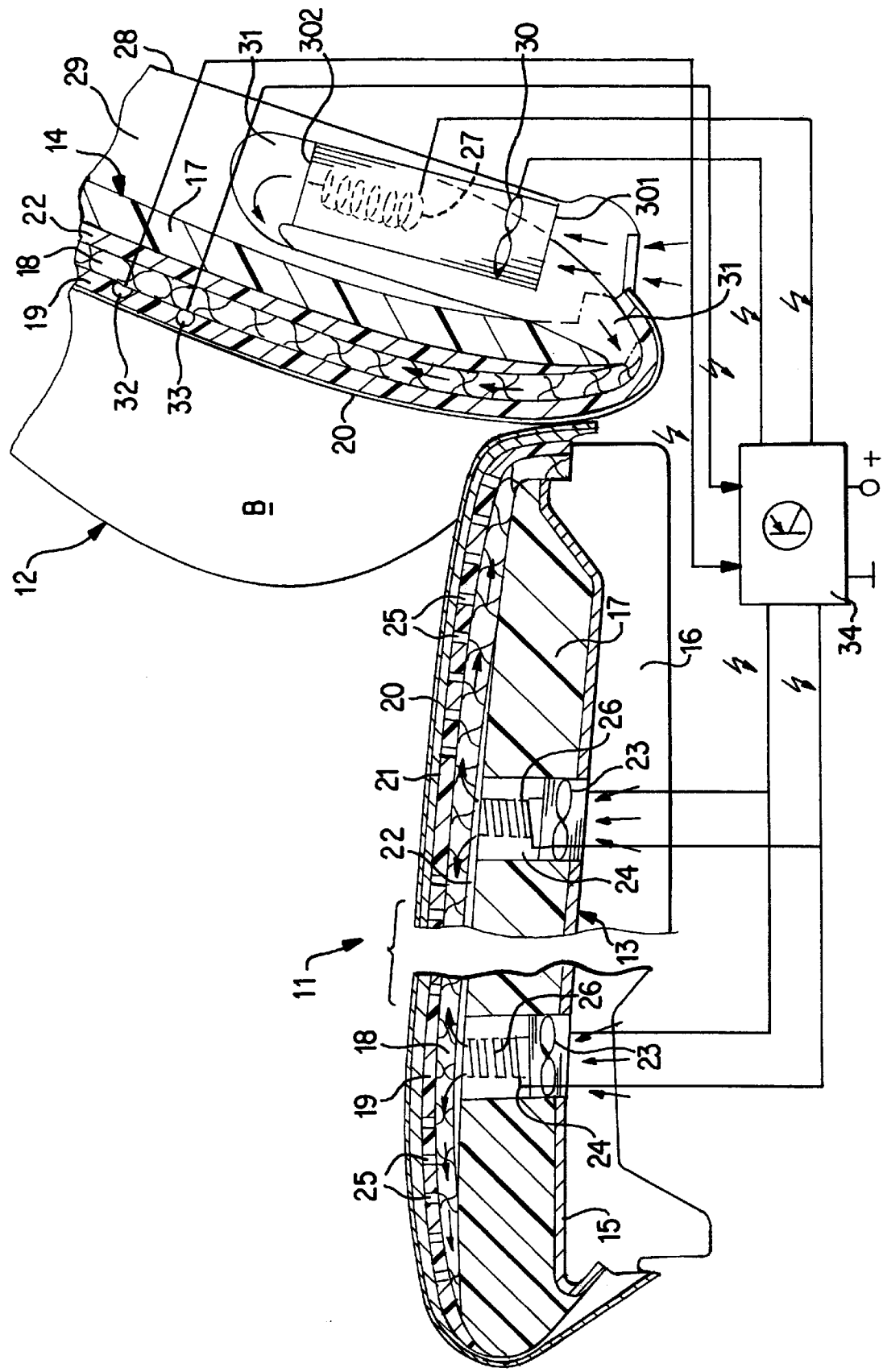

5,934,748

VEHICLE SEAT WITH TEMPERATURE AND VENTILATION CONTROL AND METHOD OF OPERATION

This application claims the priority of German patent application No. 19703516.7, filed Jan. 31, 1997, the disclosure of which is expressly incorporated by reference herein.

BACKGROUND AND SUMMARY OF THE INVENTION

In a known vehicle seat with a so-called active cushion ventilation (German Patent Document DE 39 03 303 A1), the seat and backrest cushions are equipped with what is known as a ventilation layer. Air is blown through the ventilation layer by a ventilation device and exits at the cushion surface. The air causes a cooling effect at the cushion surface and provides for the removal of transpiration moisture, i.e. perspiration. The ventilating air taken in by the ventilation device is air-conditioned by an air conditioner.

In order to avoid overcooling when the ventilation air is adjusted so as to be too cold, it has been suggested to take in the ventilation air from under the vehicle. When the vehicle is heated by sun radiation, this air is at approximately 35° C. and, therefore, is clearly cooler than the cushion surface, which is heated to approximately 60–100° C. (German Patent Document DE 196 28 698 C1). Since the normal skin temperature of a human being is approximately 35° C., there is still a temperature gradient between the seat user and the ventilation air. As a result, this ventilation air can still carry away heat from the seat user to the environment in order to achieve climatic comfort. During what is known as "summer switching", the ventilation device is started automatically when the vehicle door is unlocked. As long as nobody has sat down in the seat, air at approximately 30° C. blown through the ventilation layer of the cushions results in cooling of the significantly warmer cushion surface. When the vehicle seat is occupied, the ventilation air absorbs both heat and water vapor emitted by the seat user by transpiration. When the seat user perspires, an additional cooling effect is achieved due to evaporation. This is desirable as long as the seat user's skin temperature does not fall under the normal value of approximately 35° C. However, if the cushion temperature falls below the skin temperature, then overcooling may occur. This impairs a feeling of comfort.

It is an object of the invention to improve a vehicle seat of the initially mentioned type such that, while a high climatic comfort is maintained in the seat and back area of the vehicle seat, the possibility of overcooling is eliminated.

In a vehicle seat having seat and backrest cushions, a ventilation device for ventilating the cushions and a heating device for heating the cushions are provided. The seat includes a control unit which, on an input side, is connected with a temperature sensor arranged in the backrest cushion and, on an output side, with an electric circuit of the ventilation device and the heating device. The control unit operates the ventilation and heating devices so that, at cushion surface temperatures which are measured by the temperature sensor and which are situated above an indicated value, it switches on the ventilation device or changes the ventilation device to a higher power stage, and/or switches off the heating device or changes the heating device to a lower heating capacity. At cushion surface temperatures which are below the indicated value, the control unit switches off the ventilation device or changes the ventilation device to a lower power stage, and/or switches on the heating device or changes the heating device to a higher power stage.

The vehicle seat according to the invention has the advantage of producing an optimal sitting climate with cushion temperatures in the range of the normal human skin temperature, which ensures dry clothing and skin, and also under extreme conditions which exist, for example, during long drives at high outside temperatures, when entering a vehicle heated by sun radiation, or when a perspiring or hot person enters a cold vehicle.

The temperature sensor is arranged in a lower area of the backrest cushion, and the lower area of the backrest cushion approximately covers loin areas of seat users of different sizes. The indicated value for the cushion surface temperature corresponds approximately to a seat user's skin temperature and, preferably, is about 34° C.

The control unit may also be connected on the input side with a moisture meter arranged in the backrest cushion close to a cushion surface. Switching-on, switching-off and/or power changing of the ventilation device and/or the heating device takes place after a regulating function is performed by the control unit such that a cushion surface temperature is maintained approximately constant at a temperature which is in the range of the indicated value. Ventilation air maintains an approximately maximal absorption capacity for transpiration moisture. The ventilation device may take in air from below the vehicle seat.

According to a preferred embodiment of the invention, the control unit has a regulating function which is designed such that the powers of the ventilation and heating devices are appropriately adjusted such that, on the one hand, the cushion surface temperature remains approximately constant in the range of the indicated value and, on the other hand, an approximately maximal absorption of transpiration moisture by the ventilation air is maintained. This regulating function permits an optimizing of the seat temperature to be achieved, since the ventilation and the heating of the vehicle seat are coordinated with one another such that the cushion surface temperature corresponds approximately to the normal skin temperature of the sitting person. Moisture precipitated by transpiration is also carried away very fast. In this case, the cooling effect which occurs because of evaporation is also utilized without allowing the cushion surface temperature to fall below the skin temperature. The targeted heating of the ventilation air in a correspondingly adapted air quantity results in an increased carrying away of moisture, in dry clothing, and in a comfortable cushion temperature.

Other objects, advantages and novel features of the present invention will become apparent from the following detailed description of the invention when considered in conjunction with the accompanying drawings.

BRIEF DESCRIPTION OF THE DRAWING

The invention will be explained in detail with reference to an embodiment illustrated in the single drawing FIGURE. This drawing FIGURE is a longitudinal sectional view of a vehicle seat according to the invention.

DESCRIPTION OF THE PREFERRED EMBODIMENT

The vehicle seat has a seat part 11, which is adjustably held on the vehicle floor, and a backrest 12. For adjusting the inclination of the backrest 12, the backrest is swivellably connected with the seat part 11 by way of a swivel locking arrangement which is not shown here. The seat part 11 and the backrest 12 each have a cushion 13 and 14. The cushion 13 of the seat part 11 (seat cushion 13) is fastened on a cushion carrier or support 15 which in this case is constructed as a spring core made of spring wire which is mounted in a frame 16 of the seat part 11. The seat cushion 13 includes a cushion layer 17 resting on the cushion carrier 15, a ventilation layer 18, made of a wide-meshed spaced knit, which covers the whole surface of the cushion layer 17 and through which air can flow, a pressure distribution layer 19 which rests on the ventilation layer and which is perforated to form a relatively dense screen, and an air-permeable cushion covering 20 which spans the surface facing the sitting person. Between the cushion covering 20 and the pressure distribution layer 19, a cover filling 21 is also worked in, and a thin foil or nonwoven layer 22 is placed between the ventilation layer 18 and the cushion layer 17.

A plurality of electrically driven miniature ventilators or miniature fans 23 is arranged in the cushion layer 17. The fans 23 take in air from the area of the vehicle interior situated below the seat part 11 and blow it into the ventilation layer 18. In the spaced knit of the ventilation layer 18, the air can spread in all directions and, when the seat is unoccupied, can flow out through the cushion cover 20 into the air space above the seat surface and thus cause a fast cooling of the seat surface. When the seat part 11 is occupied, the air sweeps along in the spaced knit of the ventilation layer 18 and flows out again through the uncovered holes 25 of the perforation as well as at the open ends of the cushion 13. In this case, the air flow generates an increased air moisture gradient and removes the air moistened by transpiration by the sitting person. The miniature fans 23 are arranged in air ducts 24 in the cushion layer 17 in which, in addition, a heating spiral 26 is integrated for heating the air flowing through the air ducts 24. Instead of the heating spiral 26, a conventional heater, having heat conductors which are placed in the cover filling 21, may be provided.

The cushion 14 of the backrest 12 (backrest cushion 14) is constructed with a backrest surface and two lateral bulges. The drawing shows only the right bulge B. A hollow space 29, which is open at the lower end of the backrest 12, is provided between the backrest cushion 14 and an air-impermeable rear wall 28. In the hollow space 29, a central fan 30 is arranged so that its intake opening 301 points downward to the open end of the hollow space 29 and its blow-out opening 302 is connected with a flexible duct 31. A heating spiral 27 for heating the blown-out air is connected in front of the blow-out opening 302 of the fan 30. As in the case of the seat part 11, the backrest cushion 14 is fastened on a cushion support, which is not shown here and is preferably a spring core mounted in a frame, and has a cushion layer 17, a ventilation layer 18 which covers the cushion layer over its whole surface with the insertion of an air-impermeable foil or foam layer 22, a pressure distribution layer 19 which is arranged on the ventilation layer 18, and an air-permeable cushion covering 20 which spans the surface of the seat. In the surface area at the lower end, the ventilation layer 18 is lengthened by way of the cushion layer 17 and is connected to the flexible duct 31. In the lower area of the backrest cushion 14, a temperature sensor 32 and, optionally, a moisture meter 33 are arranged in the pressure distribution a layer 19. For seat users of difference sizes, the temperature sensor and the moisture meter are situated approximately in their loin areas. As an alternative, several fans can be arranged as in the driver's cushion.

For adjusting a climate so that sitting is comfortable, a control unit 34 is provided. The input side of the control unit is connected with the temperature sensor 32 and the moisture meter 33. The output side of the control unit is connected with the electric circuit of the ventilation device formed by the miniature fans 23 and the fan 30, and with the electric circuit of the heating device formed by the heating spirals 26 and 27. The control algorithm of the control unit 34 can now be designed differently as a function of the cushion temperature on the cushion surface measured by the temperature sensor 32. The following operation sequences are created:

1. An indicated cushion surface temperature value is preferably adjusted to the skin temperature of a sitting person, which is approximately 35° C. When the cushion surface temperature is above the indicated value, the ventilation device 23, 30 is switched on or changed to a higher power stage. If the cushion surface temperature falls below the value of approximately 35° C., then the ventilator power is reduced again or completely switched off.

2. If the cushion surface temperature is above the indicated value of approximately 35° C., then the heating device 26, 27 is switched off or its heating capacity is reduced. If the cushion surface temperature falls below the indicated value, then the heating device 26, 27 is switched on again or is changed to a higher heating capacity.

3. If the cushion surface temperature is above the indicated value of approximately 35° C., then the heating device 26, 27 is switched off and the power of the ventilation device 29, 30 is increased. As an alternative, the heating capacity of the heating device 25, 26 can also only be reduced and the ventilation device 23, 30 can be switched on. If the cushion surface temperature again falls below the indicated value, then the power of the ventilation unit 23, 30 is reduced again or is completely switched off, and either the heating device 26, 27 is switched on or its heating capacity is increased.

The described control algorithms can also be replaced by a regulating function in connection with the moisture meter 33. This regulating function is designed such that the outputs of the ventilation device 23, 30 and of the heating device 26, 27 are regulated such that, on the one hand, the cushion surface temperature remains approximately constant in the range of the indicated value of approximately 35° C. and, on the other hand, an approximately maximal absorption of transpiration moisture by the ventilation air is ensured.

The particular embodiment described is only an example of the invention and is not to be considered the only embodiment encompassed by the following claims.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Vehicle seat having seat and backrest cushions, a ventilation device for ventilating at least one of the cushions, and a heating device for heating at least one of the cushions, comprising:

a control unit which, on an input side, is connected with a temperature sensor arranged in the backrest cushion and, on an output side, is connected with an electric circuit of the ventilation device and the heating device and which operates the ventilation and heating devices so that, at cushion surface temperatures which are measured by the temperature sensor and which are situated above an indicated value, it switches on the ventilation device or changes the ventilation device to a higher power stage, and/or switches off the heating device or changes the heating device to a lower heating capacity, and at cushion surface temperatures which are below the indicated value, switches off the ventilation device or changes the ventilation device to a lower power stage, and/or switches on the heating device or changes the heating device to a higher power stage, and a moisture meter with which the control unit is also connected on the input side, wherein switching-on, switching-off and/or power changing of the ventilation device and/or the heating device takes place after a regulating function is performed by the control unit such that a cushion surface temperature is maintained approximately constant at the indicated value, and ventilation air maintains an approximately maximal absorption capacity for transpiration moisture.

2. Vehicle seat according to claim 1, wherein the temperature sensor is arranged in a lower area of the backrest cushion.

3. Vehicle seat according to claim 2, wherein the lower area of the backrest cushion approximately covers loin areas of seat users of different sizes.

4. Vehicle seat according to claim 1, wherein the indicated value for the cushion surface temperature corresponds approximately to a seat user's skin temperature.

5. Vehicle seat according to claim 1, wherein the moisture meter is arranged in the backrest cushion close to a cushion surface.

6. Vehicle seat according to claim 1, wherein the ventilation device takes in air from below vehicle seat.

7. A vehicle seat having seat and backrest cushions, a ventilation device for ventilating the cushions, and a heating device for heating the cushions, comprising:

a control unit having an input and an output, a temperature sensor arranged in the backrest cushion and connected to the control unit input, a moisture meter connected to another control unit input, and an electric circuit, selectively operating the ventilation device and the heating device, connected to the control unit output, said control unit increasing cushion ventilation, decreasing cushion heating, or increasing cushion ventilation and decreasing cushion heating at cushion surface temperatures measured by the temperature sensor which are above a predetermined value, and decreasing cushion ventilation, increasing cushion heating, or decreasing cushion ventilation and increasing cushion heating at cushion surface temperatures which are below the predetermined value so that regulation of the ventilation device, the heating device, or both the ventilation device and the heating device by the control unit maintains the cushion surface temperature approximately at said predetermined temperature value and the ventilation air at an approximately maximal absorption capacity for transpiration moisture.

8. The vehicle seat according to claim 7, wherein said ventilation device includes at least one fan operable to draw air from under the seat through one of said cushions.

9. The vehicle seat according to claim 7, wherein said ventilation device includes at least one fan in each of said cushions operable to draw air from under the seat through said cushions.

10. The vehicle seat according to claim 7, wherein said ventilation device includes a plurality of fans in one of said cushions operable to draw air from under the seat through said one of said cushions.

11. The vehicle seat according to claim 7, wherein the temperature sensor is arranged in a lower area of the backrest cushion.

12. The vehicle seat according to claim 11, wherein the lower area of the backrest cushion approximately covers loin areas of seat users of different sizes.

13. The vehicle seat according to claim 7, wherein the predetermined value is approximately 34° C.

14. The vehicle seat according to claim 7, wherein the moisture meter is arranged in the backrest cushion close to the cushion surface.

15. The vehicle seat according to claim 7, wherein the ventilation device takes in air from below the vehicle seat.

* * * * *